A. L. PALMER.
COMBINED MILK STIRRER AND AERATOR.
APPLICATION FILED MAR. 27, 1913.
1,067,056.
Patented July 8, 1913.
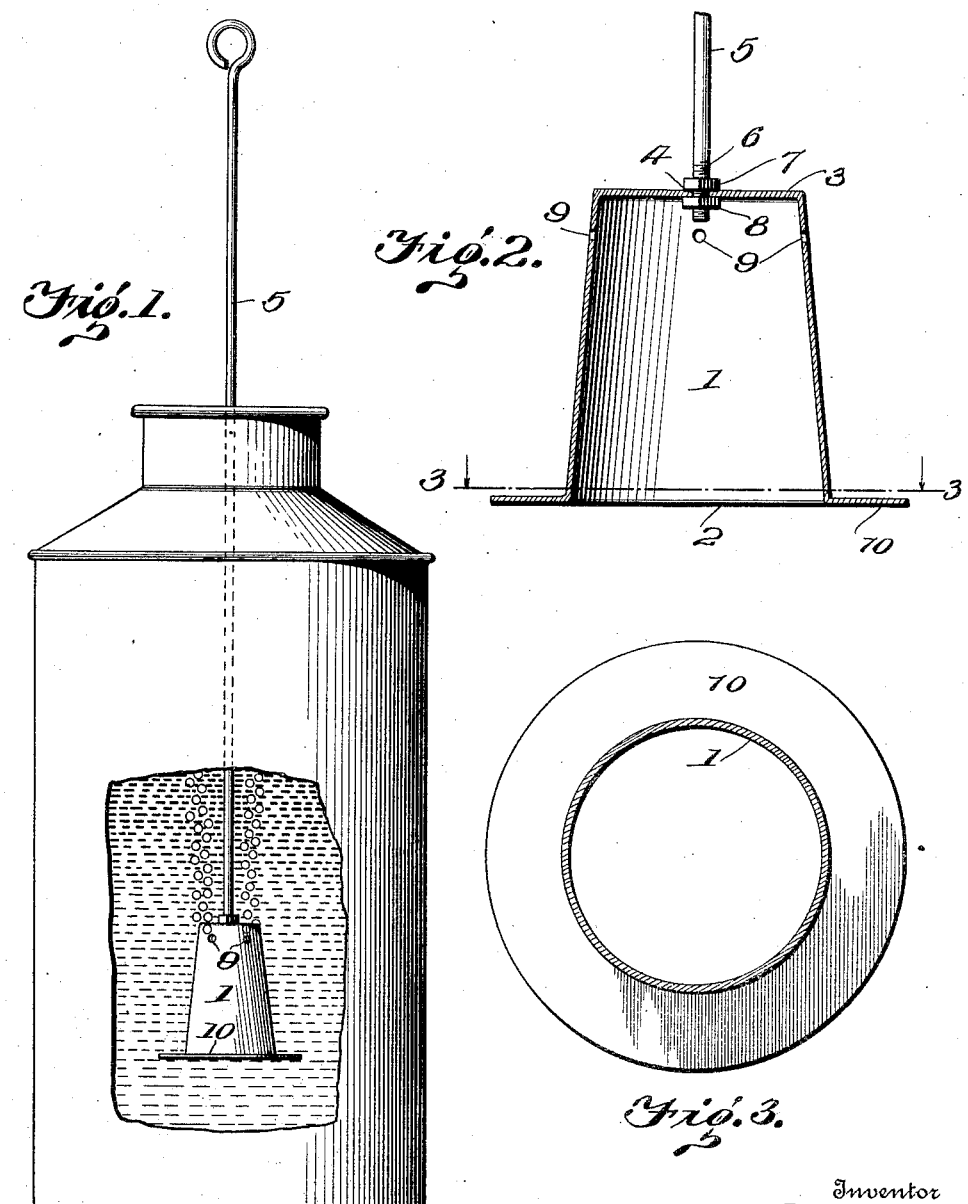
Witnesses
C. R. Wright
L. L. Burket
Inventor
A. L. Palmer
By A. S. Pattison,
Attorney

UNITED STATES PATENT OFFICE.

ARTHUR L. PALMER, OF CHENANGO FORKS, NEW YORK.

COMBINED MILK STIRRER AND AERATOR.

1,067,056.  Specification of Letters Patent.  Patented July 8, 1913.

Application filed March 27, 1913. Serial No. 757,243.

*To all whom it may concern:*

Be it known that I, ARTHUR L. PALMER, a citizen of the United States, residing at Chenango Forks, in the county of Broome and State of New York, have invented certain new and useful Improvements in Combined Milk Stirrers and Aerators, of which the following is a specification, reference being had therein to the accompanying drawing.

This invention relates to improvements in combined milk stirrer and aerator.

The object of my invention is to provide a simple, cheap and effective device of this character in which the milk can be more thoroughly stirred and aerated without removing it from the cans in which it is shipped or stored.

In the accompanying drawings Figure 1, is a vertical sectional view of the ordinary milk can showing my device in operation. Fig. 2, is an enlarged vertical sectional view of my improved stirrer and aerator showing in detail the handle attaching means. Fig. 3 is a horizontal transverse sectional view of Fig. 2.

Referring now to the drawings 1 represents the body portion of my improved stirrer and aerator and which is of an inverted truncated cone shaped, open at its lower end as indicated at 2. The upper end 3 of the body portion is provided with a central opening 4 through which passes the lower end of the handle 5. This handle may be of any desired form but preferably of that form shown in the drawing and has its lower end screwthreaded as indicated at 6 and screwed thereon above and below the upper end 3 of the body portion are nuts 7 and 8, whereby the handle is rigidly and yet removably held on the body portion. This specific means could be varied without departing from my invention but a removable handle enables the body portion to nestle one within the other for packing and shipping and the handles can be separately packed thus saving considerable in the crating and shipping of the devices.

The truncated cone shaped body portion is provided with a series of openings 9 a short distance from the upper closed end and are arranged around the periphery thereof, and are for the purpose of allowing the air to pass outwardly as the device is forced down through the milk or liquid causing the same to be more thoroughly aerated as will be hereinafter more fully described.

The lower end of the truncated cone shaped body portion is provided with an outwardly extending flange 10 entirely surrounding the same. This flange is shown of a considerable width and causes a greater agitation of the milk or liquid as the device is raised and lowered through the liquid and which greatly aids in the aeration of the milk or liquid.

Applicant is aware that receptacles have been used to force air into liquids to aerate the same but such receptacles do not have the handle secured to the center thereof nor do they show the outwardly extending flange for causing a greater agitation of the liquid and necessarily a more thorough aeration of the liquid.

In operation my improved device is placed in the can or other receptacle in which the milk to be aerated is held and when the lower end of the truncated cone shaped body portion enters the liquid the air therein is prevented from passing outwardly around the lower end thereof. The continued downward movement causes the air within the truncated cone shaped member to be compressed by the liquid from below and forces the air out through the small openings and its passes upwardly through the liquid and aerates the same. The flange carried by the lower end of the truncated cone shaped member necessarily causes a greater opening in the liquid in its upward and downward movement and therefore agitates the liquid to a greater extent and more thoroughly aerates the same.

Having thus fully described my invention what I claim as new and desire to secure by Letters Patent is:

1. A combined stirrer and aerator comprising an inverted receptacle having openings adjacent its upper end, a handle and a flange carried by the lower end and extending outwardly in a horizontal direction.

2. A combined stirrer and aerator comprising an inverted receptacle having openings adjacent its upper end, a handle carried by the upper end of the receptacle in the center thereof, and a horizontal flange carried by the lower end of the receptacle at right-angles to the handle.

3. A combined stirrer and aerator, comprising an inverted receptacle having openings adjacent its upper end, a handle secured to the upper end of the receptacle in the center thereof, and a horizontal flange carried by the lower open end of the receptacle and extending at right angles to the handle.

4. A combined stirrer and aerator, comprising an inverted conical-shaped receptacle having openings adjacent its upper end and a central opening in its upper horizontal end, a handle having a screw-threaded portion passing through said opening, a nut on said screw-threaded handle above and below the upper end of said receptacle and a broad horizontal flange carried by the extreme lower end of the receptacle and entirely surrounding the same and extending at right angles to the handle.

In testimony whereof I hereunto affix my signature in the presence of two witnesses.

ARTHUR L. PALMER.

Witnesses:
RALPH TERWILLIGER,
E. H. PALMER.

Copies of this patent may be obtained for five cents each, by addressing the "Commissioner of Patents, Washington, D. C."